United States Patent
Song et al.

(10) Patent No.: US 8,989,292 B2
(45) Date of Patent: Mar. 24, 2015

(54) TRANSFORMATION APPARATUS AND METHOD

(75) Inventors: Yang Song, PuDong Jinqiao Shanghai (CN); Jinhui Chen, PuDong Jinqiao Shanghai (CN); Hongwei Yang, PuDong Jinqiao Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 62 days.

(21) Appl. No.: 13/639,580

(22) PCT Filed: Apr. 7, 2010

(86) PCT No.: PCT/CN2010/071593
§ 371 (c)(1),
(2), (4) Date: Oct. 5, 2012

(87) PCT Pub. No.: WO2011/124023
PCT Pub. Date: Oct. 13, 2011

(65) Prior Publication Data
US 2013/0022141 A1    Jan. 24, 2013

(51) Int. Cl.
*H04B 7/02* (2006.01)
*H04L 1/02* (2006.01)
(Continued)

(52) U.S. Cl.
CPC ........ *H04L 25/03343* (2013.01); *H04B 7/0617* (2013.01); *H04B 7/0634* (2013.01); *H04B 7/065* (2013.01); *H04L 2025/03414* (2013.01); *H04L 2025/03426* (2013.01); *H04L 2025/03808* (2013.01)
USPC ......................................................... 375/267

(58) Field of Classification Search
USPC ......................................................... 375/267
See application file for complete search history.

(56) References Cited

U.S. PATENT DOCUMENTS

2008/0049709 A1*  2/2008  Pan et al. ................. 370/344
2009/0304103 A1  12/2009  Vaidyanathan et al.

FOREIGN PATENT DOCUMENTS

| CN | 101369871 A | 2/2009 |
| CN | 101512929 A | 9/2009 |
| JP | 2012-520040 | 8/2012 |

OTHER PUBLICATIONS

Notice of Reasons for Refusal of corresponding Japanese Application No. 2013-502980, dated Sep. 26, 2013, 6 pages.
(Continued)

*Primary Examiner* — Tanmay Shah
(74) *Attorney, Agent, or Firm* — Fay Sharpe LLP

(57) ABSTRACT

The present invention provides a transformation apparatus for transforming a long-term wideband channel property feedback. The transformation apparatus comprises: a first transformation unit for constructing an estimation $R_{estimation}$ of a long-term wideband transmit spatial correlation matrix with a long-term wideband beamforming matrix $u_1$ as fed back from a receiver, wherein $R_{estimation}=u_1 u_1^H$, wherein H indicates the conjugate transposition of a matrix; and/or a second transformation unit for directly obtaining a long-term wideband beamforming matrix or a precoding matrix by using a long-term wideband transmit spatial correlation matrix as fed back from a receiver. According to the technical solution of the present invention, a corresponding transformation method and apparatus is also provided.

15 Claims, 3 Drawing Sheets

(51) Int. Cl.
*H04L 25/03* (2006.01)
*H04B 7/06* (2006.01)

(56) References Cited

OTHER PUBLICATIONS

Huawei, "Adaptive Codebook Designs for DL MU-MIMO," 3GPP TSG RAN WGl meeting #57bis, Los Angeles, CA USA, Jun. 29-Jul. 3, 2009, 11 pages.

International Search Report for PCT/CN2010/071593 dated Jan. 20, 2011.

Office Action of corresponding Chinese Application No. 201080062403.9, dated May 21, 2014, 9 pages.

Wei Ning et al. "Joint Processing Precoding for Coordinated Multi-Point Transmission in LTE-A", ZTE Communications, Feb. 28, 2010, pp. 10/13 to 13/13.

* cited by examiner

US 8,989,292 B2

TRANSFORMATION APPARATUS AND METHOD

TECHNICAL FIELD

The present invention generally relates to a multi-input multi-output/multi-input single-output wireless communications system, and more specifically relates to a transformation method and apparatus for a long-term wideband channel property feedback in a multi-input multi-output/multi-input single-output wireless communications system.

TECHNICAL BACKGROUND

The way forward of feedback as agreed in 3GPP RAN #60 decides that a precoder for a subband is composed of two matrices, one of which targets at wideband and/or long-term channel properties, and the other matrix targets at frequency-selective and/or short-term channel properties. Codebooks may or may not change/vary over time and/or different subbands.

Generally, in a system, one of a long-term wideband beamforming vector and a long-term wideband transmit spatial correlation matrix is fed back as a long-term wideband channel property feedback from a mobile station to a base station based on a downlink status.

As two different forms of long-term wideband information available to a transmitter, the long-term wideband beamforming vector and the long-term wideband transmit spatial correlation matrix have been widely discussed in the standardization process of LTE-Advanced, wherein the long-term wideband beamforming matrix is for forming a beam pattern (i.e., a precoding matrix) for a receiver in a single-user multi-input multi-output/multi-input single-output wireless communications system, and the long-term wideband transmit spatial correlation matrix can be directly used to generate a precoding matrix, for example, a signal-to-leakage-plus-noise ratio (SLNR) used in the multi-user multi-input multi-output wireless communications system, or a transformed codebook which reduces the quantization error, etc.

In actuality, because improved channel state information (CSI) can not only benefit a single-user multi-input multi-output/multi-input single-output wireless system but also benefit the multi-user multi-input multi-output/multi-input single-output wireless communications system more significantly, it is commonly understood that quantization error should be reduced to the least. Current study shows that the transmit spatial correlation can help form a transformed codebook derived from a base codebook to better suit the characteristic of a user channel and further improve the system performance especially for the multi-user multi-input multi-output/multi-input single-output system. Thus, for downlink, a base station such as eNodeB must know the transmit spatial correlation information for each user equipment (UE). The transmit spatial correlation information, for example, the aforementioned long-term wideband transmit spatial correlation matrix, may be measured by UE and fed back to eNodeB. However, not all systems feed back the long-term wideband transmit spatial correlation matrix to the eNodeB. As above mentioned, UEs in some systems may merely feed back the long-term wideband beamforming matrix as the long-term wideband information to the eNodeB. Thus, in this case, the eNodeB cannot feed back the long-term wideband transmit spatial correlation matrix as obtained from the UE. Generally, what is fed back by the UE is the index corresponding to the long-term wideband beamforming matrix or long-term wideband transmit spatial correlation matrix as selected from the codebook.

Besides, those skilled in the art would appreciate that in some standards (for example, LTE-Advanced) only one form of long-term information can be prescribed, or in a particular application scenario, only one form of long-term and/or wideband information is allowed to use, i.e., long-term wideband beamforming matrix or long-term wideband spatial correlation matrix.

Therefore, it is desirable for a method capable of transforming one form of long-term and/or wideband information into another form of long-term and/or wideband information.

SUMMARY OF THE INVENTION

In order to solve the drawbacks in the prior art, embodiments of the present invention transform feedback of two forms of long-term and/or wideband channel properties in a multi-input multi-output/multi-input single-output wireless communication system so as to derive another form from one form, i.e., transforming a long-term wideband beamforming matrix as fed back into a long-term wideband transmit spatial correlation matrix or transforming a long-term wideband transmit spatial correlation matrix as fed back into a long-term wideband beamforming matrix, thereby meeting the requirements of a particular multi-input multi-output/multi-input single-output wireless communications system.

According to a first aspect of the present invention, there is provided a transformation apparatus for transforming a long-term wideband channel property feedback. The transformation apparatus comprises: a first transformation unit for constructing $R_{estimation}$ for a long-term wideband transmit spatial correlation matrix R with a long-term wideband beamforming matrix $u_1$ as fed back from a receiver, wherein $R_{estimation} = u_1 u_1^H$, wherein H denotes conjugate transposition of a matrix; and/or a second transformation unit for obtaining a long-term wideband beamforming matrix or a precoding matrix by using a long-term wideband transmit spatial correlation matrix R as fed back from a receiver.

According to a second aspect of the present invention, there is provided a transformation method for transforming a long-term wideband channel property feedback. The transformation method comprises: a first transformation step for constructing $R_{estimation}$ for a long-term wideband transmit spatial correlation matrix R with a long-term wideband beamforming matrix $u_1$ as fed back from the receiver, wherein $R_{estimation} = u_1 u_1^H$, wherein H denotes conjugate transposition of a matrix; and/or a second transformation step for obtaining a long-term wideband beamforming matrix or a precoding matrix by using a long-term wideband transmit spatial correlation matrix R as fed back from the receiver.

According to other aspects of the present invention, there is further provided a base station device, a user equipment, and a relay device comprising a transformation apparatus according to the present invention.

According to another aspect of the present invention, there is further provided a corresponding computer program product.

Other features and advantages of the present invention will become more apparent after reading the detailed depiction on the embodiments of the present invention with reference to the accompanying drawings.

BRIEF DESCRIPTION OF THE ACCOMPANYING DRAWINGS

DETAILED DESCRIPTION OF THE PREFERRED EMBODIMENTS

Figure 1:
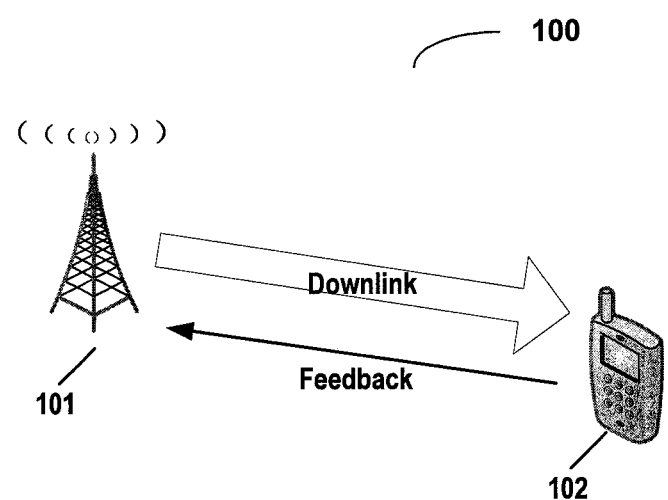
FIG. 1 illustrates a multi-input multi-output/multi-input single-output wireless communication system in which the embodiments of the present invention can be implemented.

FIG. 1 illustrates a multi-input multi-output/multi-input single-output wireless communication system in which the embodiments of the present invention can be implemented.

In FIG. 1, with a downlink from a base station to a user equipment in a multi-input multi-output wireless communication system as an example, an application scenario for the embodiments of the present invention is described.

As illustrated in FIG. 1, a base station 101 has multiple transmit antennas for sending signals in a spatial diversity manner to a particular user equipment 102 in the downlink direction.

The user equipment 102 has a single or multiple receive antennas. The user equipment 102 measures the downlink signal so as to feed back to the base station 101 information specific to frequency selectivity and/or short-term channel property and information specific for wideband and/or long-term channel property. Here, the present invention relates to transforming the fed back information of wideband and/or long-term channel properties.

According to the embodiments of the present invention, based on the feedback of two forms of long-term and/or wideband channel properties in a multi-input multi-output/multi-input single-output wireless communication system, one form may be derived from another form, i.e., a long-term wideband beamforming matrix as fed back is transformed into a long-term wideband transmit spatial correlation matrix, or a long-term wideband transmit spatial correlation matrix as fed back is transformed into a long-term wideband beamforming matrix, thereby meeting the requirements of a particular multi-input multi-output/multi-input single-output wireless communications system.

When the long-term and/or wideband channel properties are characterized by the long-term wideband beamforming matrix as fed back, by virtue of a transformation apparatus according to one embodiment of the present invention, the base station or user equipment can construct a normalized estimation of a long-term wideband transmit spatial correlation matrix by using the long-term wideband beamforming matrix. That is because in the correlation matrix, the principal eigen-vector carries most information of the correlation matrix, while the long-term wideband beamforming matrix as fed back from a particular UE can reflect the principal eigen-vector of the transmit spatial correlation matrix for a correlation of the antennas of the base station with respect to the particular UE. According to further embodiments of the present invention, the accuracy of the constructed long-term wideband transmit spatial correlation matrix may be further improved by using fed back additional information.

When the long-term and/or wideband channel properties are characterized by the long-term wideband transmit spatial correlation matrix as fed back, by virtue of a transformation apparatus according to one embodiment of the present invention, the base station or user equipment can obtain a long-term wideband beamforming matrix by using the long-term wideband transmit special correlation matrix.

Hereinafter, the working process and principle of the transformation apparatus according to the embodiments of the present invention and the flowchart of a transformation method according to the embodiments of the present invention are described in detail with reference to FIGS. 2 and 3, respectively.

Figure 2:
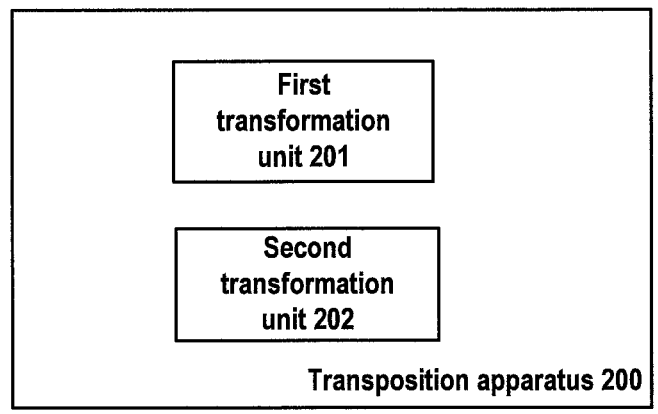
FIG. 2 illustrates a schematic block diagram of a transformation apparatus according to one embodiment of the present invention.

FIG. 2 illustrates a schematic block diagram of a transformation apparatus according to one embodiment of the present invention.

As illustrated in FIG. 2, a transformation apparatus 200 comprises a first transformation unit 201 for constructing an estimation of a long-term wideband transmit spatial correlation matrix with a long-term wideband beamforming matrix as fed back. The first transformation unit 201 estimates the long-term wideband transmit spatial matrix in response to receiving a fed back long-term wideband beamforming matrix $u_1$, by which the long-term and/or wideband channel properties are characterized. In a spatial correlation channel, for the long-term wideband beamforming matrix, the commonly used codebook is a DFT-based codebook. Usually, the long-term wideband beamforming matrix $u_1$ can reflect the information of the principal eigen-vector of the long-term wideband transmit spatial matrix as measured by the UE. Particularly, the long-term wideband beamforming matrix $u_1$ can be determined based on the principal eigen-vector of the long-term wideband transmit spatial correlation matrix as measured by the UE.

Let $d_1, \ldots, d_N$ denote the eigen-values of the long-term wideband transmit spatial correlation matrix for a certain UE in descending order, wherein N denotes a rank of the transmit spatial correlation matrix, and in the case of full rank, N denotes the number of transmit antennas of the base station; let $u_1, \ldots, u_N$ be the eigen-vectors corresponding to $d_1, \ldots, d_N$, the normalized long-term wideband transmit spatial correlation matrix is expressed as:

$$R = \text{normalize}\left(\sum_{i=1}^{N} d_i u_i u_i^H\right) = \frac{\sum_{i=1}^{N} d_i u_i u_i^H}{\left\|\sum_{i=1}^{N} d_i u_i u_i^H\right\|} \quad 1)$$

Because the principal eigen-vector $u_1$ carries the most information of the correlation matrix R, the first transformation unit 201 estimates the long-term wideband transmit spatial correlation matrix as:

$$R_{estimation} = u_1 u_1^H \quad 2)$$

Further, the first transformation unit 201 may further improve the accuracy of the constructed long-term wideband spatial correlation matrix estimation by using fed back additional information.

As an example, the off-diagonal scaling factors $a_1, \ldots, a_{N-1}$ of the spatial correlation matrix of the base station with respect to a particular user equipment may be fed back as additional information from for example a user equipment such as a mobile station to the base station, such that the first transformation unit 201 corrects the estimated long-term wideband transmit spatial correlation matrix $R_{estimation}$. If $$R_{estimation} = \begin{bmatrix} r_{11} & r_{12} & \cdots & r_{1,N} \\ r_{12}^* & r_{22} & & \vdots \\ \vdots & & \ddots & r_{N-1,N} \\ r_{1,N}^* & \cdots & r_{N-1,N}^* & r_{N,N} \end{bmatrix},$$

then the corrected estimation of the long-term wideband transmit spatial correlation matrix may be expressed as:

$$R_{correction} = \begin{bmatrix} r_{11} & a_1 r_{12} & \cdots & a_{N-1} r_{1,N} \\ a_1 r_{12}^* & r_{22} & & \vdots \\ \vdots & & \ddots & a_1 r_{N-1,N} \\ a_{N-1} r_{1,N}^* & \cdots & a_1 r_{N-1,N}^* & r_{N,N} \end{bmatrix} \quad 3)$$

wherein the symbol * denotes conjugate of a complex number.

Those skilled in the art would appreciate that this correction can effectively correct the estimated modular values of respective elements in R, such that it more approximates a real long-term wideband transmit spatial correlation matrix. Particularly, the off-diagonal scaling factors in a highly spatial correlated channel can present such feature $a_n = a_1^{n-1}$. Thus, in the highly spatial correlated channel, the feedback of the additional information will not significantly increase feedback load for the system.

As another example, the radio of the eigen-values $d_i$ to $d_1$ (wherein i>2) and the eigen-vector $u_j$ corresponding to $d_i$ may be fed back as additional information from a user equipment such as a mobile station to the base station, such that the first transformation unit 201 corrects the estimated long-term wideband transmit spatial correlation matrix $R_{estimation}$. For example, $d_2/d_1, \ldots, d_{2+j}/d_1$ and the corresponding eigen vectors $u_2, \ldots, u_{2+j}$ (wherein 0≤j≤N−2) may be fed back as additional information from the mobile station to the base station so as to correct $R_{estimation}$. That is because, according to equation 1), the normalized long-term wideband transmit spatial correlation matrix R can be expanded as:

$$R = \text{normalize}\left(u_1 u_1^H + \frac{d_2}{d_1} u_2 u_2^H + \ldots + \frac{d_j}{d_1} u_{2+j} u_{2+j}^H + \ldots \right), \quad 4)$$

Thus, $R_{correction} = \text{normalize}\left(u_1 u_1^H + \frac{d_2}{d_1} u_2 u_2^H + \ldots + \frac{d_j}{d_1} u_{2+j} u_{2+j}^H \right)$ Because the larger the eigen value is, the more information amount of the correlation matrix R is carried by the corresponding eigen vector, considering a tradeoff between system feedback efficiency and correcting $R_{estimation}$, in one preferred embodiment, the first transformation unit 201 only needs $d_2/d_1$ and $u_2$ to correct $R_{estimation}$, i.e., the scenario where j=0 in above equation 4):

$$R_{correction} = \text{normalize}\left(u_1 u_1^H + \frac{d_2}{d_1} u_2 u_2^H\right) \quad 5)$$

It should be understood that if the preferable long-term wideband beamforming matrix $u_1$ is selected from a codebook through other criteria such as obtaining the maximum capacity of the system, then the first transformation unit 201 may also calculate $R_{estimation}$ using the above equation 2), i.e., $R_{estimation} = u_1 u_1^H$ By utilizing the estimated long-term wideband transmit spatial correlation matrix $R_{estimation}$, particularly and preferably, the corrected matrix $R_{correction}$ can help form a transformed codebook derived from a basic codebook so as to better adapt the user channel properties and further improve system performance of particularly the multi-user multi-input multi-output/multi-input single-output system. Thus, the estimated long-term wideband transmit spatial correlation matrix (or preferably the corrected long-term wideband transmit spatial correlation matrix) and a basic codebook may form a transformed codebook. With the transformed codebook, the precoding matrix and effective channel matrix can be quantized to achieve a better quantization error.

Preferably, as illustrated in FIG. 2, the transformation apparatus 200 further comprises a second transformation unit 202 for directly obtaining a long-term wideband beamforming matrix or precoding matrix by using a long-term wideband transmit spatial correlation matrix as fed back.

For a multi-user multi-input multi-output/multi-input single-output wireless communication system, a second transformation unit 202 may use a long-term wideband transmit spatial correlation matrix to directly generate, by means of some algorithms, a precoding matrix (i.e., a long-term wideband beamforming matrix) to be used in a precoding process of the multi-user multi-in multi-output/multi-input single-output wireless communication system. Such algorithm for example may be a signal-to-leakage-plus-noise ratio (SLNR) algorithm, etc.

For a single-user multi-input multi-output/multi-input single-output wireless communication system, the second transformation unit 202 determines a long-term wideband beamforming matrix according to the following manner: the long-term wideband beamforming matrix is composed of a plurality of eigen-vectors of the spatial correlation matrix; the plurality of eigen-vectors are selected according to the eigen-values of the eigen-vectors in a descending order; the number of eigen-vectors depends on the number of streams sent to the same user.

It should be noted that although in the embodiments as shown in FIG. 2 illustration has been made with the downlink scenario from the base station to the user equipment as an example. However, it should be understood that the transformation apparatus 200 may also serve an uplink scenario from a user equipment to a base station. In other words, the transformation apparatus 200 may serve and/or be integrated with any transmitter side requires utilization of the long-term wideband channel information as fed back from the receiver side in a multi-input multi-output/multi-input single-output wireless communications system, including a base station, a user equipment, and a relay device.

Besides, although the embodiments as illustrated in FIG. 2 includes a first transformation unit 201 and a second transformation unit 202, those skilled in the art would appreciate that in a particular application scenario, the transformation apparatus 200 may also only have one of the first transformation unit 201 or the second transformation unit 202.

Figure 3:
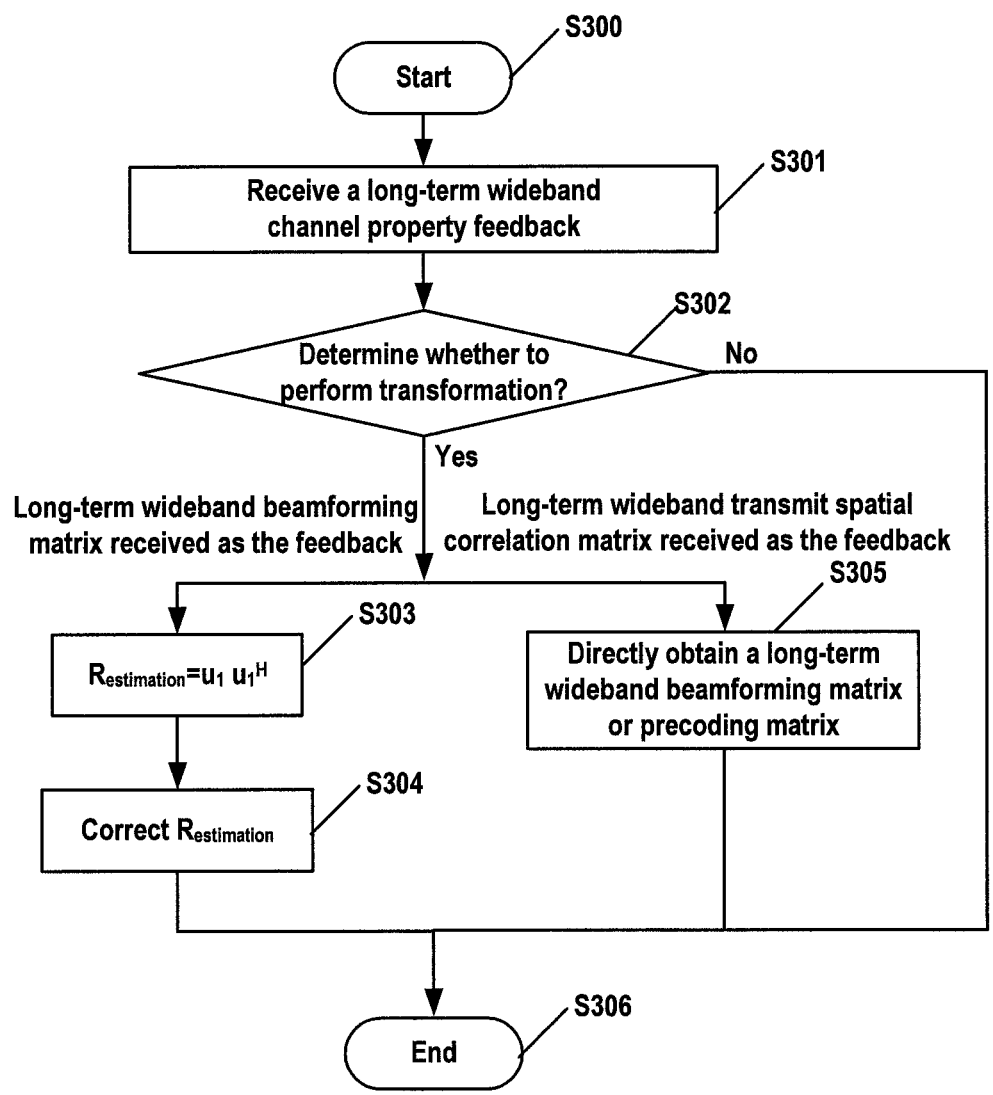
FIG. 3 illustrates a schematic flow chart of a transformation method according to one embodiment of the present invention.

FIG. 3 illustrates a schematic flow chart of a transformation method according to one embodiment of the present invention.

As illustrated in FIG. 3, in step S300, the process flow starts.

In step S301, a feedback information of the long-term and/or wideband channel properties is received.

In step S302, it is determined whether it is necessary to perform transformation on the received long-term and/or wideband channel property feedback. The transmitter may utilize two different forms of long-term wideband information, i.e., a long-term wideband beamforming matrix and a long-term wideband transmit spatial correlation matrix. If the feedback information of the long-term wideband channel properties is not the long-term wideband information desired by the transmitter, then it is required to perform a transformation on the received feedback. If the result of determining is "Yes," then step S303 or step S305 is continued to execute; if the result of determining is "No," then the processing flow ends in step S306.

In steps S303-S304, the long-term wideband beamforming matrix $u_1$ received as the feedback information is transformed to generate the required long-term wideband transmit spatial correlation matrix R.

In step S303, the long-term wideband transmit spatial correlation matrix is estimated according to the aforementioned equation 2), i.e., $R_{estimation}=u_1 u_1^H$, wherein H indicates the conjugate transposition of a matrix.

Preferably, in step S304, $R_{estimation}$ is further corrected by using the fed back additional information (for the sake of brevity, FIG. 3 does not show the step of receiving the fed back additional information). The additional information is for example the off-diagonal scaling factors $a_1, \ldots, a_{N-1}$ of the spatial correlation matrix of the transmitter side with respect to a particular receiver, then the corrected long-term wideband transmit spatial correlation matrix is shown as equation 3) as above mentioned. In another example, the receiver side feeds back to the transmitter side $d_2/d_1, \ldots, d_{2+j}/d_1$ among the eigen-values $d_1, \ldots, d_N$ of the long-term wideband transmit spatial correlation matrix arranged in a descending order and their corresponding eigen-vectors $u_2, \ldots, u_{2+j}$ (wherein $0 \leq j \leq N-2$), then the corrected long-term wideband transmit spatial correlation matrix is shown in equation 4) as above mentioned. Preferably, let j=0, then the corrected long-term wideband transmit spatial correlation matrix is shown in equation 5) as above mentioned.

In step 305, the long-term wideband transmit spatial correlation matrix R received as the feedback information is transformed so as to directly generate the required long-term wideband beamforming matrix or precoding matrix.

For a multi-user multi-input multi-output/multi-input single-output wireless communication system, for example, some algorithms may utilize a long-term wideband transmit spatial correlation matrix to directly generate a precoding matrix, i.e., a long-term wideband beamforming matrix, so as to facilitate the precoding process of the multi-user multi-input multi-output/multi-input single-output wireless communication system. Such algorithm for example may be the signal-to-leakage-and-noise ratio (SLNR), etc.

For a single-user multi-input multi-output/multi-input single-output wireless communication system, for example, the long-term wideband beamforming matrix may be determined according to the following manner: the long-term wideband beamforming matrix is composed of a plurality of eigen-vectors of the spatial correlation matrix; the plurality of eigen-vectors are selected according to the eigen-values of the eigen-vectors in a descending order; the number of selected eigen-vectors depends on the number of streams sent to the same user.

In step S306, the method flow ends.

The transformation apparatus and transformation method are described according to the embodiments of the present invention. The transformation apparatus according to the present invention and the processing function steps performed by the transformation apparatus may be implemented as individual functional modules, which may also be merged into one or a few of functional modules, wherein the functional modules may completely adopt an implementation manner of complete hardware, an implementation manner of complete software, or an implementation manner simultaneously comprising hardware and software elements. According to one implementation manner, the processing process as described in the detailed description may be stored in a readable memory medium of the computing device or may be any device or medium that can store code and/or data available to the computing system, which includes, but not limited to, an application-specific integrated circuit field programmable gate array (FPGA), a semiconductor memory etc. according to one implementation manner, the above respective processing modules may be implemented by means driving a general computer, or may be implemented by other processor devices such as a microcontroller, a field programmable gate array (FPGA) application-specific integrated circuit (ASIC) or a combination thereof.

Although the embodiments of the present invention have been described with reference to the accompanying drawings, those skilled in the art would make various transformations or modifications within the scope of the appended claims.

What is claimed is:

1. A transformation apparatus for transforming a long-term evolution (LTE) wideband channel property feedback, comprising:
   a first transformation unit for constructing an estimation $R_{estimation}$ of a long-term evolution wideband transmit spatial correlation matrix R with a long-term evolution wideband beamforming matrix $u_1$ as fed back from a receiver, wherein $R_{estimation}=u_1 u_1^H$, where H indicates the conjugate transposition of a matrix; and a second transformation unit for directly obtaining a long-term evolution wideband beamforming matrix or a precoding matrix by using a long-term evolution wideband transmit spatial correlation matrix as fed back from a receiver.

2. The transformation apparatus according to claim 1, wherein the first transformation unit corrects the estimation of the long-term evolution wideband spatial correlation matrix using additional information as fed back from the receiver, thereby improving transformation accuracy.

3. The transformation apparatus according to claim 2, wherein the fed back additional information comprises off-diagonal scaling factors $a_1, \ldots, a_{N-1}$ of a spatial correlation matrix of a transmitter with respect to a particular receiver, wherein $$R_{estimation} = \begin{bmatrix} r_{11} & r_{12} & \cdots & r_{1,N} \\ r_{12}^* & r_{22} & & \vdots \\ \vdots & & \ddots & r_{N-1,N} \\ r_{1,N}^* & \cdots & r_{N-1,N}^* & r_{N,N} \end{bmatrix},$$

then a corrected estimation of the long-term evolution wideband transmit spatial correlation matrix is:

$$R_{correction} = \begin{bmatrix} r_{11} & a_1 r_{12} & \cdots & a_{N-1} r_{1,N} \\ a_1 r_{12}^* & r_{22} & & \vdots \\ \vdots & & \ddots & a_1 r_{N-1,N} \\ a_{N-1} r_{1,N}^* & \cdots & a_1 r_{N-1,N}^* & r_{N,N} \end{bmatrix},$$

wherein the symbol * denotes a conjugate of a complex, and N denotes a rank of the transmit spatial correlation matrix.

4. The transformation apparatus according to claim 2, wherein the fed back additional information comprises ratios $d_2/d_1, \ldots, d_{2+j}/d_1$ of eigen-values $d_1, \ldots, d_N$ of the long-term evolution wideband transmit spatial correlation matrix as fed back from the receiver and the corresponding eigen-vectors $u_2, \ldots, u_{2+j}$, wherein the eigen values $d_1, \ldots, d_N$ are arranged in a descending order and $0 \leq j \leq N-2$, N denotes a rank of the transmit spatial correlation matrix, then the corrected estimation of the long-term evolution wideband transmit spatial correlation matrix is:

$$R_{correction} = \text{normalize}\left(u_1 u_1^H + \frac{d_2}{d_1} u_2 u_2^H + \ldots + \frac{d_j}{d_1} u_{2+j} u_{2+j}^H\right).$$

5. The transformation apparatus according to claim 4, wherein j=0, and the corrected estimation of the long-term evolution wideband transmit spatial correlation matrix is:

$$R_{correction} = \text{normalize}\left(u_1 u_1^H + \frac{d_2}{d_1} u_2 u_2^H\right).$$

6. The transformation apparatus according to claim 1, wherein for a multi-user multi-input multi-output/multi-input single-output wireless communication system, the second transformation unit directly generates the precoding matrix using the long-term evolution wideband transmit spatial correlation matrix using an algorithm selected from the following group, wherein the group comprises a signal-to-leakage-plus-noise ratio algorithm.

7. The transformation apparatus according to claim 1, wherein for a single-user multi-input multi-output/multi-input single-output wireless communication system, the second transformation unit determines the long-term evolution wideband beamforming matrix according to the following manner: the long-term evolution wideband beamforming matrix is composed of multiple eigen-vectors of the long-term evolution wideband spatial correlation matrix; the multiple eigen-vectors are selected according to the eigen-values of the eigen-vectors in a descending order; the number of the selected eigen vectors depends on a number of streams sent to a same user.

8. A transformation method for transforming a long-term evolution (LTE) wideband channel property feedback, comprising:
a first transformation step for constructing an estimation $R_{estimation}$ of a long-term evolution wideband transmit spatial correlation matrix R with a long-term evolution wideband beamforming matrix $u_1$ as fed back from a receiver, wherein $R_{estimation} = u_1 u_1^H$, wherein H indicates the conjugate transposition of a matrix;
and
a second transformation for directly obtaining a long-term evolution wideband beamforming matrix or a precoding matrix by using a long-term evolution wideband transmit spatial correlation matrix as fed back from a receiver.

9. The transformation method according to claim 8, wherein in the first transformation, the estimation of the long-term evolution wideband spatial correlation matrix is corrected by using the additional information as fed back from the receiver, thereby improving transformation accuracy.

10. The transformation method according to claim 9, wherein the fed back additional information comprises off-diagonal scaling factors $a_1, \ldots, a_{N-1}$ of a spatial correlation matrix of a transmitter with respect to a particular receiver, wherein $$R_{estimation} = \begin{bmatrix} r_{11} & r_{12} & \cdots & r_{1,N} \\ r_{12}^* & r_{22} & & \vdots \\ \vdots & & \ddots & r_{N-1,N} \\ r_{1,N}^* & \cdots & r_{N-1,N}^* & r_{N,N} \end{bmatrix},$$

then a corrected estimation of the long-term evolution wideband transmit spatial correlation matrix is:

$$R_{correction} = \begin{bmatrix} r_{11} & a_1 r_{12} & \cdots & a_{N-1} r_{1,N} \\ a_1 r_{12}^* & r_{22} & & \vdots \\ \vdots & & \ddots & a_1 r_{N-1,N} \\ a_{N-1} r_{1,N}^* & \cdots & a_1 r_{N-1,N}^* & r_{N,N} \end{bmatrix},$$

wherein the symbol * denotes a conjugate of a complex, and N denotes a rank of the transmit spatial correlation matrix.

11. The transformation method according to claim 9, wherein the fed back additional information comprises ratios $d_2/d_1, \ldots, d_{2+j}/d_1$ of eigen-values $d_1, \ldots, d_N$ of the long-term evolution wideband transmit spatial correlation matrix as fed back from the receiver and the corresponding eigen-vectors $u_2, \ldots, u_{2+j}$, wherein the eigen values $d_1, \ldots, d_N$ are arranged in a descending order and $0 \leq j \leq N-2$, N denotes a rank of the transmit spatial correlation matrix, then the corrected estimation of the long-term evolution wideband transmit spatial correlation matrix is:

$$R_{correction} = \text{normalize}\left(u_1 u_1^H + \frac{d_2}{d_1} u_2 u_2^H + \ldots + \frac{d_j}{d_1} u_{2+j} u_{2+j}^H\right).$$

12. The transformation method according to claim 11, wherein j=0, and the corrected estimation of the long-term evolution wideband transmit spatial correlation matrix is:

$$R_{correction} = \text{normalize}\left(u_1 u_1^H + \frac{d_2}{d_1} u_2 u_2^H\right).$$

13. The transformation method according to claim 8, wherein in the second transformation step, for a multi-user multi-input multi-output/multi-input single-output wireless communication system, the precoding matrix is directly generated using the long-term evolution wideband transmit spatial correlation matrix with an algorithm selected from the following group, wherein the group comprises a signal-to-leakage-plus-noise ratio algorithm.

14. The transformation apparatus according to claim 8, wherein in the second transformation, for a single-user multi-input multi-output/multi-input single-output wireless communication system, the long-term evolution wideband beamforming matrix may be determined according to the following manner: the long-term evolution wideband beamforming matrix is composed of multiple eigen-vectors of the long-term evolution wideband spatial correlation matrix; the multiple eigen-vectors are selected according to the eigen-values of the eigen-vectors in a descending order; the number of the selected eigen vectors depends on a number of streams sent to a same user.

15. A device comprising a transformation apparatus according to claim 1,
wherein said device is any one selected from a base station, a user equipment and a relay device.

* * * * *